United States Patent [19]

Tavss et al.

[11] Patent Number: 4,595,612
[45] Date of Patent: Jun. 17, 1986

[54] LAMINATED POLYESTER CONTAINING SUBSTRATE AND COLLAPSIBLE DISPENSING CONTAINER MADE THEREFROM

[75] Inventors: Edward A. Tavss, Kendall Park, N.J.; Samuel C. Temin, Needham, Mass.

[73] Assignee: Colgate-Palmolive Company, New York, N.Y.

[21] Appl. No.: 739,486

[22] Filed: May 30, 1985

Related U.S. Application Data

[63] Continuation of Ser. No. 567,001, Dec. 30, 1983, abandoned.

[51] Int. Cl.[4] .................. B27N 5/02; B32B 15/08; B32B 15/12; B32B 27/10
[52] U.S. Cl. ..................... 428/35; 428/458; 428/464; 428/481; 428/537.5

[58] Field of Search .......... 428/481, 483, 464, 537.1, 428/35, 36, 511, 458, 537.5; 430/497

[56] References Cited

U.S. PATENT DOCUMENTS 3,152,515 10/1964 Land ........................... 430/497
4,197,326 4/1980 Wakamatsu et al. ........... 428/483 X
4,359,499 11/1982 Akao et al. ..................... 428/481 X Primary Examiner—Thomas J. Herbert
Attorney, Agent, or Firm—Eric P. Schellin

[57] ABSTRACT

There is disclosed a substrate of layers of materials comprising polyester layers having sandwiched therein between a metal foil layer and a paper layer all suitably adhered to one another. It is also contemplated that the substrate be employed in fabricating a dentifrice tube.

15 Claims, 2 Drawing Figures 4,595,612

LAMINATED POLYESTER CONTAINING SUBSTRATE AND COLLAPSIBLE DISPENSING CONTAINER MADE THEREFROM

This application is a continuation of application Ser. No. 567,001, filed Dec. 30, 1983, now abandoned.

FIELD OF THE INVENTION

The present invention relates broadly to the container part, the invention is more particularly concerned with a collapsible dispensing container of laminated wall construction in the body portion thereof, whereby product permeation and absorption, and oxygen absorption are substantially prevented in all regions of the container structure susceptible thereto.

BACKGROUND OF THE INVENTION

Collapsible tubes formed of metallic and plastic materials have long been known in the packaging field. Extruded metal tubes are inherently brittle and repeated use not infrequently results in wall cracks so that product is exuded from a location other than the essentially rigid dispensing orifice. Of the prior art metal tubes, aluminum tubes, while probably being the least brittle, are somewhat limited in their applications since up to the present time it has not been possible to apply to the interior surfaces thereof a completely satisfactory coating, when required to prevent attack and corrosion of the metal by alkaline or acid contents and contamination of the contents by the reaction products. Notwithstanding the relatively brittle nature of a metal tube, the mentioned internal coating operation requires an additional processing step which necessarily increases the cost of the final article.

Tubes formed of polyethylene and other plastic materials have enjoyed wide commercial success in the packaging of many products; however, certain other products after a time have been noted to deteriorate when contained therein. Plastics as exemplified by polyethylene are permeable to a degree when employed in the wall thicknesses used in tubular containers, and the essential oils embodied in most dentifrices for flavoring purposes are reduced in volume during storage of the container, rendering the dentifrice less palatable. Also, the plastic container wall absorbs oxygen over a period of time and ultimately may decompose the product, which has actually been found to be the case with fluoride-containing toothpastes.

It has accordingly been proposed to provide a relatively thin metallic foil barrier between the product and the polyethylene tube body to prevent the mentioned loss if essential oils and the absorption of oxygen. The metallic barrier has been suggested as an interlayer between facing sheets of polyethylene, and that a laminate be formed by heat with or without suitable adhesives. However, while a structure of this general character is effective to prevent some product permeation and oxygen absorption through the tube body, and particularly when the inner thermoplastic layer is a copolymer of an olefin and a polar group containing monomer which is co-polymerizable therewith, there remains the possibility of product deeterioration albeit to a much lesser extent.

A disadvantage in a polyolefin surface resides in the inability of the surface to readily receive printing or decorative material. In addition, polyolefin has a memory effect, that is, it does not remain compressed when squeezed, a particular disadvantage for dentifrice tubes. To counter such lack of compressibility the metal layer must be relatively thick so that its compressibility is imposed on the plastic.

SUMMARY OF THE INVENTION

It is, therefore, an important aim of the present invention to provide a collapsible dispensing container of laminated wall construction in the body portion.

Another object of this invention lies in the provision of a tubular container having a plurality of adherent layers in the body portion thereof, one of said layers providing a barrier to product migration and oxygen absorption such as a metallic foil and another of said layers being a polyalkylene material selected from the group consisting of polyethylene terephthalate and polybutylene terephthalate or copolymer with a minor amount of other dicarboxylic acid of a varying in density, melting point and crystallinity. The latter layer being innermost and preferably outermost with different additional laminae sandwiched therein between.

Such additional layers comprise paper and suitable adhesive and bonding agents such as copolymer of ethylene and acrylic acid. The collapsible dispensing container of the present invention may be constructed from the laminated substrate of the present invention by conventional and known apparatuses. Exemplary of such equipment and method can be discerned from U.S. Pat. No. 3,832,964, which is incorporated herein by reference.

A further object of the instant invention is to provide a method of producing laminated tubes in which a tubular body is formed of a barrier layer and a polyester laminated thereto; the laminated tube body is then located on a forming member in adjacency to a barrier member also positioned thereon.

Other objects and advantages of the invention will become more apparent as the description proceeds.

BRIEF DESCRIPTION OF THE DRAWINGS

In the drawings wherein like numerals are employed to designate like parts throughout the same.

Figure 1:
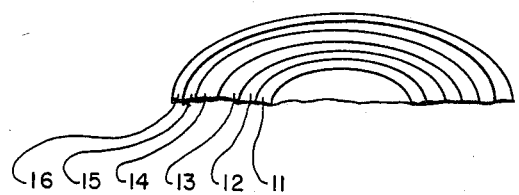
FIG. 1 is a cross-sectional view of a fragmentary portion of a laminated substrate of the present invention.

Referring now first to FIG. 1 of the drawings, a substrate 10 is shown in cross-section whereby to reveal the components of the sandwich that goes to make up the laminated configuration.

It will be seen that the bottommost layer 11 is a polyester. The second layer 12 thereabove is an adhesive layer which joins the polyester layer 11 with 30 third layer 13 which is a metal foil such as aluminum foil. The fourth layer 14 is another adhesive that adhesively secures the other surface of the metal foil layer 13 to a paper layer 15. The topmost layer 16 is a polyester.

DETAILED DESCRIPTION OF THE INVENTION

The thermoplastic polyester of the present invention encompasses polyalkylene terephthalate such as polyethylene terephthalate and polybutylene terephthalate.

The applicable polyester resins are disclosed with regard to container usage in U.S. Pat. Nos. 3,152,515 and 4,197,326. These patents disclose, for instance, as a polyester polyethylene terephthalate. These patents are incorporated hereinto by reference.

It is contemplated that within the purview of the invention the adhesives may be a copolymer of ethylene and acrylic acid or methacrylic acid, or sodium or zinc salts thereof in a diluent system.

The metal foil may be preferably aluminum foil.

The paper layer is desirably a kraft paper.

The thickness range of each of the layers is as follows:
Polyethylene terephthalate layer 11 0.5 mils to 3.0 mils, preferably 1.0 mils.
Adhesive layer 12—sufficient to assure adherence
Metal foil layer 13—0.5 mils to 2.0 mils, preferably 1.0 mils
Adhesive layer 14—sufficient to assure adherence
Paper layer 15—1.5 mils to 2.5 mils, preferably 2.0 mils.
Polyethylene terephthalate layer 16—3.5 mils to 5.0 mils, preferably 4.0 mils.

The topmost Polyethylene terephthalate layer 16 adheres to the paper layer 15 by means of the application of sufficient heat and pressure to the substrate. In the event the application of heat and pressure is not appropriate a suitable adhesive is to be employed.

Figure 2:
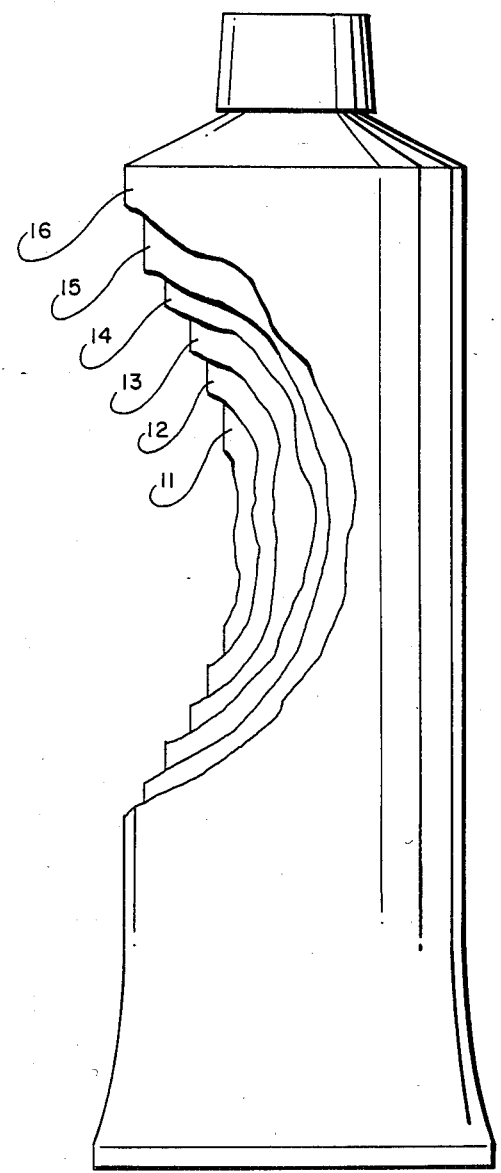
FIG. 2 is a side elevational view of a collapsible dispensing container embodying the novel concepts of this invention, with portions of the body walls being broken away to more fully illustrate the laminated structure.

FIG. 2 is an example of the laminated structure of a collapsible container with the layers being demonstrated as in FIG. 1 with layer 11 being inner most and the other layer being of the same materials and in the same order as shown.

It is believed manifest from the foregoing that applicant has provided a collapsible container structure which substantially reduces the problems heretofore unsolved by the prior art. The laminated substrate and laminated shoulder piece 20 completely eliminates product permeation and oxygen absorption, and this highly desirable result is achieved by the use of low cost materials which preferably are combined into laminated form in the manner indicated in FIG. 2.

The outer layer of an polyethylene terephthalate thereof is a thermoplastic capable of fusion during a side seaming step and granting adequate protection to the paper and metallic foil interlayer. The art of seaming of a collapsible dentifrice tube of the general type herein disclosed can be seen in U.S. Pat. No. 3,295,725, incorporated herein by reference.

However, the outer layer of polyalkylene terephthalate and paper may be eliminated if the foil barrier is of sufficient thickness to resist damage, and by flowing a thermoplastic material into the overlap side seam during the sealing thereof when such a system is employed.

Further, the outer layer may be paper in a three-ply laminate form of paper, foil and a polyalkylene terephthalate as described. As the outermost and innermost layers are preferably the same, the folded edges of the tube produced from the substrate is conveniently heat bonded. A suitable adhesive can be used when heat bonding is not possible. This modification is in addition to the aforementioned four-ply laminates comprised of from outside to in, polyalkylene terephthalate, paper, foil and polyalkylene terephthalate; or polyalkylene trephthalate, foil, paper and polyathylene terephthalate. It is contemplated that suitable adhesives will be employed between the laminae whenever necessary. Like structures can be employed for the shoulder piece, cap, neck, rod, piston and in the construction of dispensing valves for such containers, particularly in conjunction with the interior portions exposed to the contained dentifrice, and, again, where required, compatible adhesives would naturally be employed.

Various modifications of the invention have been disclosed herein, and these and other changes can of course be effected without departing from the novel concepts of the instant contribution. Additionally when cast as a film on the interior surfaces of fiber drums used for the storage of flavored dentifrice, the material will retard flavor loss into the drums, thereby extending storage life.

The polyethylene terephthalate (PET) is particularly useful because it has very low flavor absorption characteristics as can be seen from the following tables where PET is compared with polyethylene where the thicknesses of layers or coating are the same:

TABLE I

ABSORPTION OF FLAVOR FROM A DENTIFRICE PASTE
(Aging Condition: 1 Week at Room Temperature)

| | Flavor Absorbed (%) |
|---|---|
| PET | 0.1 |
| PET Aluminized (1½–2 ohm) | 0.0 |
| PET Aluminized (2–3 ohm) | 0.0 |
| Nylon 6,6 | 0.5 |
| Polyethylene | 2.4 |

TABLE II

ABSORPTION OF FLAVOR FROM A DENTIFRICE GEL
(Aging Condition: 2 Weeks at Room Temperature)

| | Flavor Absorbed (%) |
|---|---|
| PET | 0.0 |
| PET Aluminized (1½–2 ohm) | 0.0 |
| PET Aluminized (2–3 ohm) | 0.0 |
| Nylon 6,6 | 0.2 |
| Polyethylene | 1.0 |

What is claimed is:

1. A collapsible paste dispensing container of layers of material having low flavor absorption charaterisitics comprising a first intermost layer of a polyester, a second layer of metal foil, a third layer of paper, and an outermost fourth layer of a polyester.

2. A dispensing container according to claim 1, when the low flavor absorption characteristics range from about 0.1 about 0.5 percent.

3. The container of claim 1 wherein the polyester is a polyalkylene terephthalate.

4. The container of claim 3 wherein the polyester is a polyethylene terephthalate.

5. The container of claim 4 wherein the first layer of the polyester is secured to the metal foil with an adhesive.

6. The container of claim 4 wherein the third layer of paper is secured to the fourth layer of the polyester with an adhesive.

7. The container of claim 4 wherein the first layer of the polyester is secured to the metal foil with an adhesive and wherein the third layer of paper is secured to the fourth layer of the polyester with an adhesive.

8. The substrate of claim 7 wherein the adhesive is a copolymer of ethylene and acrylic acid.

9. A substrate of layers of materials having low flavor absorption characteristics, comprising a first layer of a polyester, a second layer of metal foil, a third layer of paper, and a fourth layer of a polyester.

10. The substrate of claim 9 wherein the polyester is a copolymer of an polyalkylene terephthalate.

11. The substrate of claim 10 wherein the polyalkylene terephthalate is polyethylene terephthalate.

12. The substrate of claim 11 wherein the first layer of the polyethylene terephthalate is secured to the metal foil with an adhesive.

13. The substrate of claim 12 wherein the third layer of paper is secured to the fourth layer of the polyethylene terephthalate with an adhesive.

14. The substrate of claim 13 wherein the first layer of the polyethylene terephthalate is secured to the metal foil with an adhesive and wherein the third layer of paper is secured to the fourth layer of the polyethylene terephthalate with an adhesive.

15. The substrate of claim 14 wherein the adhesive is a copolymer of ethylene and acrylic acid.

* * * * *